United States Patent
Dixon

[11] 3,837,626
[45] Sept. 24, 1974

[54] DETACHABLE SAFETY WARNING DEVICE
[76] Inventor: Herd Vrill Dixon, Route No. 1, Box 208, Montgomery, La. 71454
[22] Filed: June 26, 1973
[21] Appl. No.: 373,894

[52] U.S. Cl. ................................................ 256/64
[51] Int. Cl. ............................................ E01f 13/00
[58] Field of Search ................... 256/64, 59, 24, 1; 116/63 P; 404/6–9

[56] References Cited
UNITED STATES PATENTS
2,997,978   8/1961   Clutter ............................. 256/64 X
3,380,429   4/1968   Moinicken et al. ................ 256/64 X FOREIGN PATENTS OR APPLICATIONS
798,792   3/1936   France ................................. 256/64
1,121,604   7/1968   Great Britain ....................... 256/64

Primary Examiner—Dennis L. Taylor

[57] ABSTRACT

The detachable safety warning device invention utilizes posts with weighted feet connected by rod or cable spanning the distance between said posts with socketed connected tubular pipe bodies having longitudinal slots running the full length of each pipe to enable the quick assembly of same over said rod or cable and quick detaching of said pipes from said rod or cable stretched between said posts. The device is used to locate across roads in repair or under construction with writings and/or colored safety warning displays painted on or attached to a single pipe or a series of pipes joined together and mounted on said rod or cable. Said pipes, preferably, are to be made of plastic or other suitable light weight material. Thus, is an oncoming vehicle on the roadway did by accident collide with safety warning device it would not cause any damage or very slight damage to the vehicle or the driver and passengers therein. The feet on the posts are weighted with water, dirt or other easily accessible materials which may be dumped when said device is to be moved to another location. Said feet are open at their tops so that the weighted materials may be dumped therefrom and said device may be disassembled, handled and transported to another location for use in a facile manner.

4 Claims, 8 Drawing Figures

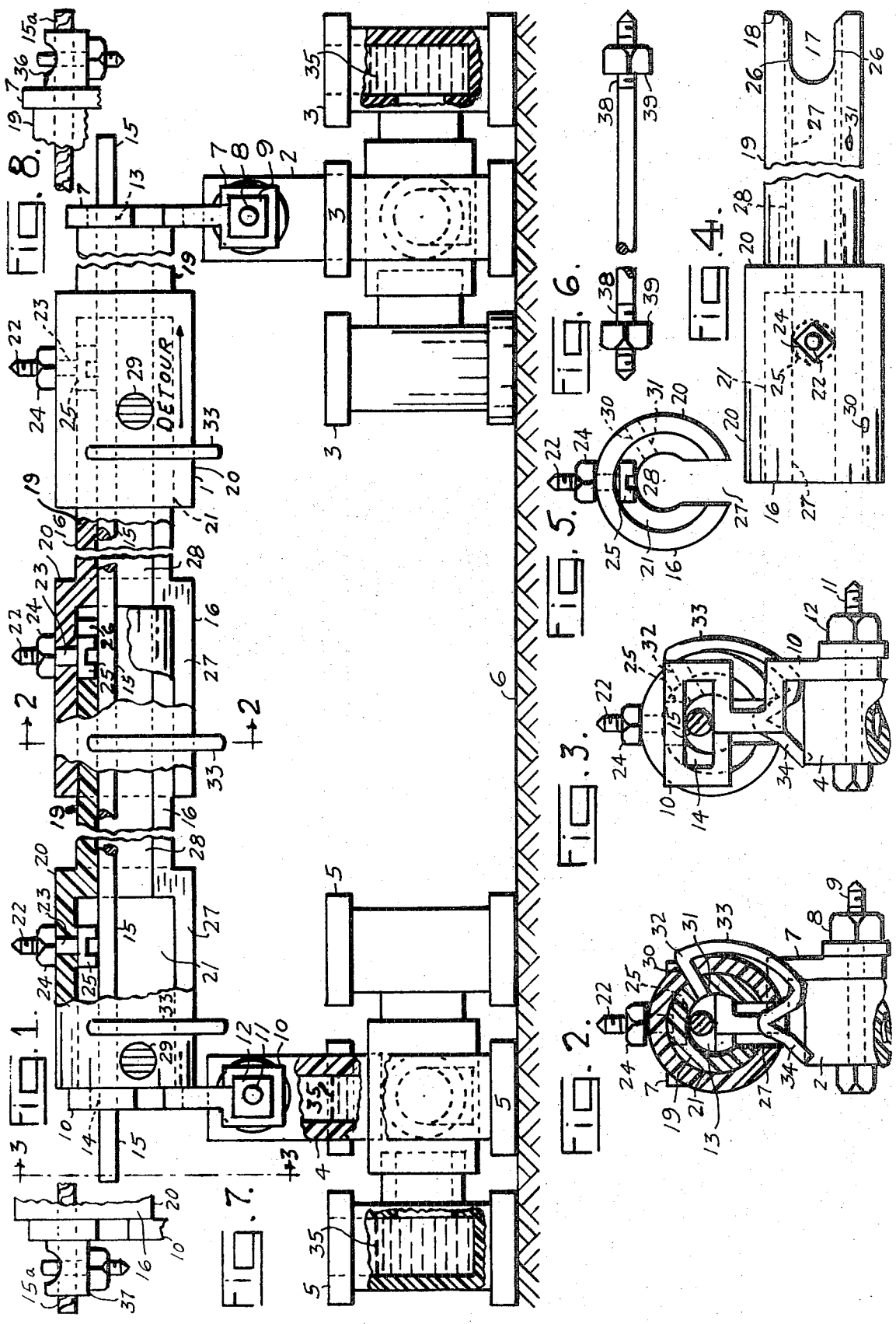

DETACHABLE SAFETY WARNING DEVICE

An object of the invention is to provide a detachable safety warning device of the character described which may be quickly assembled across a roadway and quickly dis-assembled and transported to another location in a facile manner.

Another object of the invention is provide a detachable safety warning device of the character described when in position across a roadway should an oncoming vehicle accidentally collide therewith little or no damage results to the device, or, to the vehicle or the driver or passengers therein as the device is made of plastic or other suitable yieldable materials but tough and sturdy.

Another object of the invention is provide a detachable safety warning device of the character described which may be totally salvaged and used over many times.

A still further object of the invention is provide a detachable safety warning device of the character described which is very inexpensive to manufacture.

A still further object of the invention is to provide a detachable safety warning device of the character described which is made of plastic or other suitable tough light weight material that makes it very inexpensive to handle and transport from one location to another.

These and other objects of the invention will in part be obvious and will in part be more fully disclosed in the specifications, one embodiment of which is illustrated in the accompanying drawings, in which:

FIG. 1 is a side view, partly sectional, of a detachable safety warning device seated on the earth's surface or on a foundation;

FIG. 2 is a vertical sectional view taken on the line 2—2 of FIG. 1;

FIG. 3 is a vertical sectional view taken on the line 3—3 of FIG. 1;

FIG. 4 is a top view of one of a series of a plurality of connected tubular pipe bodies as shown in FIG. 1;

FIG. 5 is an end view of the enlarged end portion of a tubular pipe body shown in FIG. 4 and showing enlarged hole forming socket therein;

FIG. 6 is a side view of a rod having threaded ends with threaded nuts thereon that may be substituted for rod shown in FIG. 1, or, substituted for cable and end clamps shown in FIGS. 7 and 8;

FIG. 7 is a fragmentary side view of the left end of a vertical pivotal arm and adjacent tubular pipe body on cable with cable clamp thereon;

FIG. 8 is a fragmentary side view of the right end of a vertical pivotal arm and adjacent tubular pipe body on cable with cable clamp thereon.

The invention will be better understood from a more detailed description thereof, reference being had to the accompanying drawings in which like numeraled parts therein in the various views denote like numeraled parts herein.

The numeral 1 denotes the detachable safety warning device generally with right post 2 vertically disposed and having a plurality of weighted feet 3 on the lower portion thereof, and, left post 4 vertically disposed and having a plurality of weighted feet 5 on the lower portion thereof. The feet are adapted to be seated upon the earth's surface 6 or surface of a roadway or other foundation to support said posts 2 and 4 and the warning devices attached thereto. The feet 3 and 5 are open at their tops and closed at their bottoms and may be filled with water 35 or dirt or other readily available materials to provide weighted feet to anchor said posts attached thereto and in upright position to prevent over turning which may be caused by high wind currents, flood waters or the like. The feet 3 and 5 are shown to be made of plastic, as well as, the pivotal arms 7 and 10 and the tubular pipes 16.

The vertically disposed right post 2 has right pivotal arm 7 connected thereto on the upper end thereof by adjustable bolt 8 and nut 9 and said pivotal arm may be set in any angled upright position, and, the vertically disposed left post 4 has left pivotal arm 10 connected thereto on the upper end thereof by adjustable bolt 11 and nut 12 and said pivotal arm may be set in any angled upright position. The upper end of right pivotal arm 7 has rectangular hole 13 therein, and, the upper end of said left pivotal arm 10 has rectangular hole 14 therein. Said rectangular holes 13 and 14 are adapted to receive a rod 15 or cable 15a which spans the distance between said right and left pivotal arms attached to said right and left posts 2 and 4 respectively.

Tubular pipe bodies 16 have notches 17 in the upper end walls 18 of each regular reduced portion 19 of each tubular pipe body 16. The enlarged opposed ends 20 of each tubular pipe body 16 has enlarged hole therethrough forming an enlarged socket 21 therein with bolts 22 in alignment and extending through holes 23 through the upper walls of said socket 21 and secured thereto by nuts 24. Said bolts 22 having enlarged cylindrical heads 25 which extend into sockets 21 a sufficient distance to act as a guide for notches 17 to align the regular reduced end portions 19 to interfit and socket into socket 21 of another joint of pipe 16. The respective joints of said tubular pipe bodies 16 are joined together by inserting the regular reduced portions 19 into the enlarged sockets 21 of other pipe bodies so that the opposed edges 26—26 of the notches 17 in the ends 18 contact and slide by the outer side periphery of enlarged bolt heads 25 to align longitudinal slots 27 formed lengthwise from one end to the other end of a joint of pipe through the walls thereof and when joined in series said longitudinal slots 27 are in matching lengthwise relationship to each other. The longitudinal slots 27 are diametrically opposed to notches 17 and bolt heads 25 which are in common alignment.

The regular reduced portions of pipe bodies 16 have cylindrical holes therethrough which are concentric with the holes forming the enlarged sockets 21 through the opposed enlarged ends 20 of each tubular pipe body 16. The aligned longitudinal slots 27 of a plurality of joined pipe bodies 16 are placed down over said rod 15 or cable 15a spanning the distance between posts 2 and 4 which are spaced apart crossing a roadway and the upper interior surfaces of said cylindrical holes 28 of said pipe bodies seat on said rod 15 or cable 15a. The exterior surfaces 29 of said tubular pipe bodies 16 are colored red as shown in FIG. 1, but, any suitable color or colors may be used to warn an approaching driver of a vehicle that the roadway is impassible. Direction warnings in writing, for example, "DETOUR" with arrow underneath may be applied or attached to said tubular pipe bodies 16 as shown in FIG. 1, or, other suitable written warning directions or emblems to represent warnings may be used thereon, to warn oncoming driver of the danger behind the safety warning device.

Aligned holes 30 are formed through the walls of the enlarged opposed ends 20 of each tubular pipe body 16 and aligned holes 31 are formed through the walls of said regular reduced pipe body portions 19 into which matched aligned holes 30 and 31 upper angled projections 32 of spring steel latch 33 is inserted, and, the upwardly extending inverted lower portion of said latch 33 are snapped into longitudinal slots 27 to hold said tubular pipe bodies 16 together, to secure said tubular pipe bodies on rod 15 or cable 15a, and to prevent said tubular pipe bodies 16 from falling off or coming off from rod 15 15 or cable 15a. The upwardly extending inverted lower catch portion 34 of latch 33 are forced and locked into aligned longitudinal slots 27 by depressing curved middle portion of said latch 33 and enters a sufficient distance past the inside of wall 20 of said enlarged socket 21 and into engagement with longitudinal slot 27 through the wall of 19 of the interfitted regular reduced pipe body inserted into said socket 21 of an adjacent pipe body 16.

The upper portion of said feet 3 and 5 are hollow so that water 35 or other available material such as dirt may be placed therein to provide weighted feet to anchor post 2 and 4 on roadways as standards to uphold and support the connected tubular pipe bodies 16 mounted over rod 15 or cable 15a which span the distance between said posts 2 and 4.

Cable clamps 36 are attached on the right end and cable clamps 37 are attached on the left end of cable 15a outside of the pivotal arms 7 and 10 respectively to secure said cable 15a to said pivotal arms 7 and 10 as the ends of said cable 15a extend through rectangular holes 13 and 14 of said pivotal arms. The opposed ends 38—38 of rod 15 may be threaded and nuts 39—39 are screwed thereon to secure said rod 15 to the pivotal arms 7 and 10 as shown in FIG. 6, and, may be substituted for the rod 15 in FIG. 1 or the cable 15a shown in FIGS. 7 and 8. The posts 2 and 4 with feet 3 and 5 and the tubular pipe bodies 16 may be made of plastic or any other suitable tough light weight material so that the same may be easily assembled and disassembled, handled and transported from places of usage on roadways and the like.

It is obvious that many changes may be made in the details of construction and arrangement of the respective parts of the invention without departing from from the scope and spirit of the invention.

What I claim as new and desire to secure by Letters Patent, is:

1. In a detachable safety warning device, vertically disposed posts spaced apart from each other, a weighted foot on each post, a rod attached to the upper ends of said posts, a tubular body having a central longitudinal hole therethrough with a longitudinal slot through the wall thereof that extends from one end to the other end of said tubular body and in communication with said central hole, aligned holes through the wall of said tubular body circumferentially spaced away from said longitudinal slot, said tubular body mounted on said rod by placing said longitudinal slot lenghtwise over said rod and into said central longitudinal hole through said tubular body to seat the interior surface of said tubular body on the top of said rod, spring clamp means having upper angled projection and upwardly extending inverted lower end portion with curved middle portion, inserting said upper angled projection of said clamp into an aligned hole through the wall of said tubular body and depressing the middle curved portion of said clamp inwardly to spring said upwardly extending inverted lower end portion of said clamp into said longitudinal slot running lengthwise of said tubular body to lock said slotted tubular body on said rod.

2. In a detachable safety warning device, vertically disposed posts spaced apart from each other, a weighted foot on each post, a rod attached to the upper ends of said posts, a tubular body having a central longitudinal hole therethrough with a longitudinal slot through the wall thereof that extends from one end to the other end of said tubular body and in communication with said central hole, aligned holes through the wall of said tubular body circumferentially spaced away from said longitudinal slot, said tubular body mounted on said rod by placing said longitudinal slot lengthwise over said rod and into said central longitudinal hole through said tubular body to seat the interior surface of said tubular body on the top of said rod, spring clamp means having upper angled projection and upwardly extending inverted lower end portion with curved middle portion, inserting said upper angled projection of said clamp into an aligned hole through the wall of said tubular body and depressing the middle curved portion of said clamp inwardly to spring said upwardly extending inverted lower end portion of said clamp into said longitudinal slot running lengthwise of of said tubular body to lock said slotted tubular body on said rod, depressing said middle curved portion of said clamp inwardly to force said lower clamp portion out of said longitudinal slot to unlock said slotted tubular body and removing said clamp therefrom for the quick removal of said tubular body from said rod.

3. In a detachable safety warning device, vertically disposed posts spaced apart from each other, a weighted foot on each post, a rod attached to the upper ends of said posts, each tubular body having an enlarged portion on one end with an enlarged longitudinal hole therein to form a socket therein and a regular reduced portion on the opposed ends thereof and having central longitudinal hole therethrough concentric and communicating with said socket, a longitudinal slot through the walls of said tubular bodies and extending from each end thereof to the opposed end thereof and in communication with the central longitudinal holes through each of said tubular bodies, a bolt extending through the wall of the enlarged portion of each of said tubular bodies with an enlarged cylindrical head extending down into each of said sockets of said tubular bodies, aligned holes through the walls of said sockets and through said regular reduced end portions of other interfitted tubular bodies and circumferentially spaced away from said longitudinal slots, a notch extending through the upper wall of the outer ends of each regular reduced portion of said tubular bodies, interfitting said regular reduced ends of the said tubular bodies into said sockets in the enlarged ends of other tubular bodies and engaging said cylindrical bolt heads in said notches to align said longitudinal slot in one tubular body with the longitudinal slot in a connected tubular body in series and aligning said holes through the walls of said sockets with holes through the walls of said regular reduced ends of other tubular bodies interfitted together in series, spring clamp means having upper angled projection and upwardly extending inverted lower end portion with curved middle portion, inserting said upper angled projection of said clamp into aligned holes through the wall of said sockets with the aligned holes through the wall of said regular reduced end portion of said tubular bodies interfitted together and depressing said middle curved portion of said clamp inwardly to spring said upwardly extending inverted lower end poirtion of said clamp into said longitudinal slot running lengthwise of said tubular bodies to lock said slotted tubular bodies together on said rod.

4. In a detachable safety warning device, vertically disposed posts spaced apart from each other, a weighted foot on each post, a rod attached to the upper ends of said posts, each tubular body having an enlarged portion on one end with an enlarged longitudinal hole therein to form a socket therein and a regular reduced portion on the opposed ends thereof and having central longitudinal hole therethrough concentric and communicating with said socket, a longitudinal slot through the walls of said tubular bodies and extending from each end thereof to the opposed end thereof and in communication with the central longitudinal holes through each of said tubular bodies, a bolt extending through the wall of the enlarged portion of each of said tubular bodies with an enlarged cylindrical head extending down into each of said sockets of said tubular bodies, aligned holes through the walls of said sockets and through said regular reduced end portions of other interfitted tubular bodies and circumferentially spaced away from said longitudinal slots, a notch extending through the upper wall of the outer ends of each regular reduced portion of said tubular bodies, interfitting said regular reduced ends of the said tubular bodies into said sockets in the enlarged ends of other tubular bodies and engaging said cylindrical bolt heads in said notches to align said longitudinal slot in one tubular body with the longitudinal slot in a connected tubular body in series and aligning said holes through the walls of said sockets with holes through the walls of said regular reduced ends of other tubular bodies interfitted together in series, spring clamp means having upper angled projection on the upper end thereof and upwardly extending inverted lower end portion with curved middle portion, inserting said upper angled projection of clamp into aligned hole through the wall of said socket with aligned hole through the wall of said regular reduced end portion of said tubular bodies interfitted together and depressing said middle curved portion of said clamp inwardly to spring said upwardly extending inverted lower end portion of said clamp into said longitudinal slot running lengthwise of said tubular bodies to lock said slotted tubular bodies together on said rod, springing said upwardly extending inverted lower end portion of said clamp inwardly to force said lower end thereof downwardly and outwardly from engagement with said longitudinal slots to unlock said slotted tubular bodies from said rod for quick removal of said tubular bodies from said rod.

* * * * *